United States Patent [19]

Byrne

[11] Patent Number: 5,522,477
[45] Date of Patent: Jun. 4, 1996

[54] METHOD AND SYSTEM FOR LUBRICATING MOTOR VEHICLE TRANSMISSION PARTS

[76] Inventor: Thomas M. Byrne, 77 Cotswold La., Moreland Hills, Ohio 44022

[21] Appl. No.: 455,502

[22] Filed: May 31, 1995

[51] Int. Cl.⁶ .............................. F01M 9/06; F16N 7/26
[52] U.S. Cl. .......................... 184/6.12; 184/13.1; 74/467; 475/160
[58] Field of Search .................. 184/6.12, 6.26, 184/11.1, 11.2, 11.3, 13.1; 74/467; 475/160

[56] References Cited

U.S. PATENT DOCUMENTS

| | | |
|---|---|---|
| 1,396,025 | 11/1921 | Dahlquist .......................... 184/6.12 |
| 4,068,740 | 1/1978 | Quinn et al. . |
| 4,090,748 | 5/1978 | Sugimoto et al. . |
| 4,231,266 | 11/1980 | Nishikawa et al. . |
| 4,329,887 | 5/1982 | Kawamoto . |
| 4,342,489 | 8/1982 | Lenz et al. . |
| 4,348,914 | 9/1982 | Kawamoto . |
| 4,359,909 | 11/1982 | Sogo . |
| 4,400,989 | 8/1983 | Ikemoto et al. . |
| 4,448,089 | 5/1984 | Ikemoto et al. . |
| 4,621,710 | 11/1986 | Tsukamoto et al. . |

FOREIGN PATENT DOCUMENTS 0624970  6/1949  United Kingdom ................. 184/6.12

Primary Examiner—Edward K. Look
Assistant Examiner—Christopher Verdier
Attorney, Agent, or Firm—Vickers, Daniels & Young

[57] ABSTRACT

A motor vehicle transmission extension housing enclosing an output shaft rotatably supported by a bush at the rear end of the housing which requires lubrication is provided with an orifice for delivering a stream of lubricant under pressure from a source along a first unconfined path in the housing and against a deflecting surface in the housing which intersects the first path and deflects the stream of lubricant to flow along a second unconfined path at an angle to said first path and toward the bush.

25 Claims, 3 Drawing Sheets

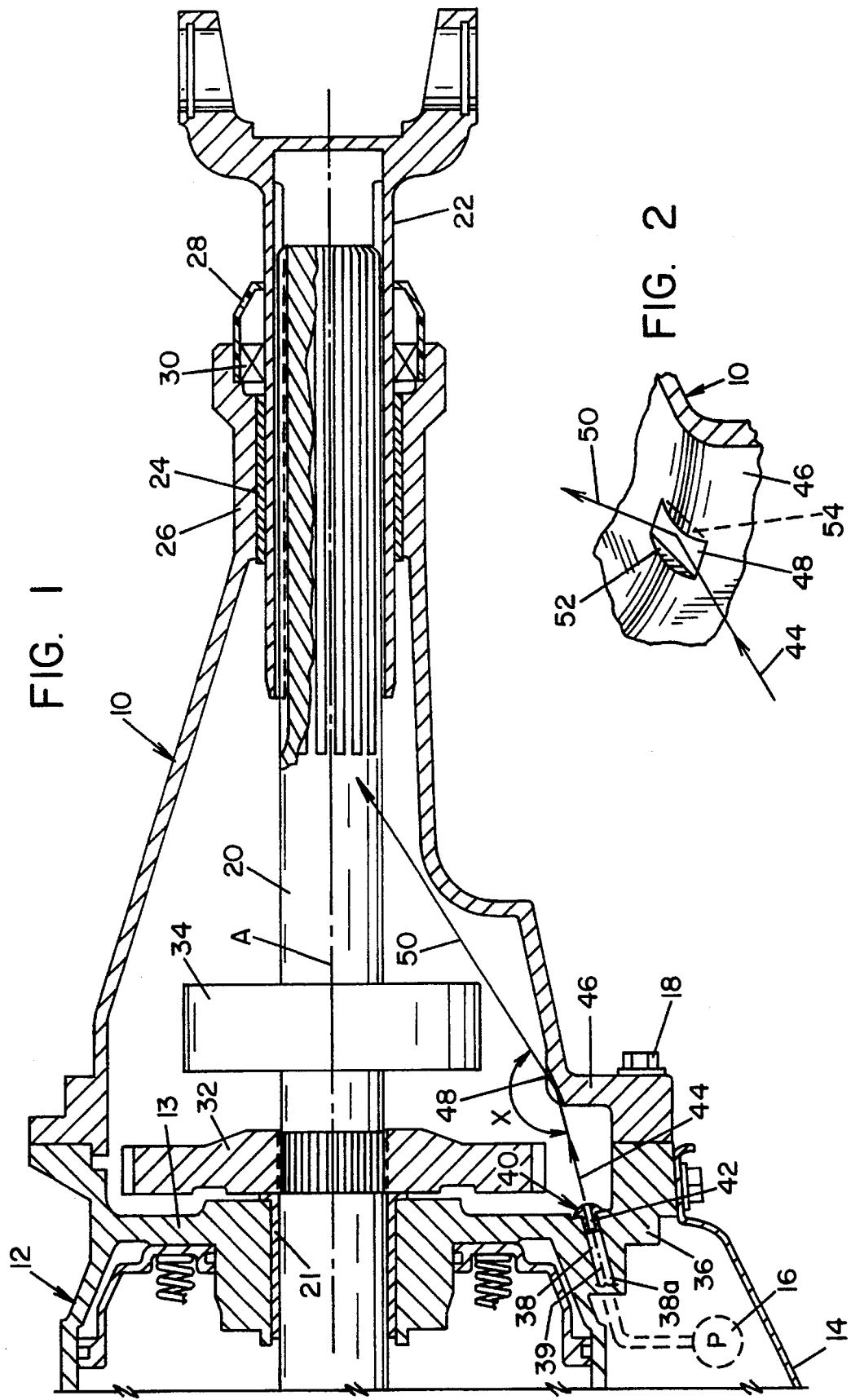

METHOD AND SYSTEM FOR LUBRICATING MOTOR VEHICLE TRANSMISSION PARTS

BACKGROUND OF THE INVENTION

This invention relates to the art of motor vehicle transmissions and, more particularly, to an improved method and system for lubricating bushings, gears and the like in such a transmission.

The present invention finds particular utility in conjunction with distributing lubricant in an automatic vehicle transmission to elements therein requiring lubrication and which, due to their location and/or the obstruction of other elements in the transmission are difficult to reach with lubricant. One such element is the rear bushing disposed adjacent the rear end of an extension housing of an automatic transmission for supporting an output shaft, and the present invention will be disclosed and described in detail in conjunction with lubricating such a rear bushing. At the same time, however, as will become apparent hereinafter, the invention is applicable to distributing lubricant to gears, bearings and other elements in a manual or automatic transmission.

As is well known from such prior art patents as U.S. Pat. No. 4,329,887 to Kawamoto and U.S. Pat. No. 4,621,710 to Tsukamoto et al, conventional automotive transmissions include an extension housing extending rearwardly from the main transmission casing or housing for supporting an output shaft and sleeve yoke by means of a bush interposed between the yoke and a bearing portion of the extension housing. Adequate lubrication of the bush has been difficult to obtain because of its location at the rear end of the extension housing, and considerable attention has been devoted to this problem as is demonstrated in part by the foregoing prior art. For example, previous efforts to lubricate the bush have included the provision of a conduit for guiding lubricating oil under pressure from a source located in the main gear case of an automatic transmission directly to the rear bush as shown in Tsukamoto et al, and pumping lubricating oil to a hollow control shaft of a speed change gear in a manual transmission for flow through the control shaft to the rear bush as shown in Kawamoto. These methods and arrangements are disadvantageous for a number of reasons, none the least of which is the cost attendant to special modifications of the extension housing and/or transmission parts and the configuring and installation of specially contoured guide tubing for the lubricant. The rear bush in a transmission such as that disclosed in Sukomoto et al has been lubricated heretofore by a direct spray of lubricant under pressure but, as will be appreciated from the latter patent, such requires the extension housing to be devoid of any interfering parts between the lubricant outlet and the bush. Furthermore, other prior art systems which rely on gravity flow of lubricant along ribs, channels or the like on the interior of the extension housing are subject to the further disadvantage that there are periods when lubricant does not flow to the rear bush, such as when the vehicle is travelling downhill.

SUMMARY OF THE INVENTION

In accordance with the present invention, a method and system is provided for lubricating motor vehicle transmission parts in a manner which is more economical than arrangements heretofore provided, more efficient with respect to controlling the distribution of lubricant and which is extremely versatile with respect to achieving lubrication of parts in a transmission housing. More particularly in accordance with the invention, lubricant is delivered through an aperture or orifice under pressure to flow unconfined along a first linear path from which the lubricant is deflected to flow unconfined to directly impact against a part in the transmission to be lubricated. In accordance with one aspect of the invention, the lubricant is deflected from the first path to a second path which is at an angle to the first path and diverted toward the part to be lubricated. The included angle between the first and second paths can be obtuse or acute, whereby it is possible to project lubricant in almost any desired direction relative to the first path and thus toward any one of a number of transmission parts in the transmission housing. Such control is of considerable advantage from the standpoint of the structural differences between vehicle transmissions and the locations of transmission parts which may require lubrication and/or which may in addition to their intended function serve to supplement distribution of lubricant in the transmission housing.

A lubricant deflector or diverter in accordance with the invention can be integral with an interior surface of the transmission housing and provided thereon by machining or grinding, or the deflector may be a separate element suitably attached to the interior of the housing and provided with a desired deflecting surface contour. With regard to the latter, the deflecting surface can be planar and disposed at an appropriate angle to the first lubricant flow path to provide for the second flow path direction to be toward a part to be lubricated. Alternatively, the deflector can be defined by a curved surface having an entrance end substantially corresponding to the direction of the first flow path and an exit end corresponding to the direction of the second flow path. As yet another alternative, the deflecting surface can have a curved entrance portion and a linear exit portion, or linear entrance and exit portions with a curved transition portion therebetween. In any event, these as well as other surface geometries which may be devised provide considerable versatility with respect to efficiently and economically directing a stream of lubricant from a source to a part in the transmission housing to be lubricated.

Still further in accordance with the invention, the lubricant deflector can be in the form of a recess having a bottom wall and side walls and in which the bottom wall provides the deflecting surface, whereby the stream of lubricant flows between the entrance and exit ends of the deflecting surface between the side walls of the recess. The recess together with the diameter of the stream of lubricant flowing along the first flow path provide control for the pattern of the stream of lubricant as it travels along the second path and, in this respect, stabilizes the lubricant against scattering laterally of the flow path when it leaves the exit end of the deflecting surface. Still further in accordance with the invention, the stream of lubricant under pressure enables projecting the lubricant a considerable distance without the use of tubing or channels on the interior of the transmission housing along which the lubricant flows by gravity, and the flow of the lubricant under pressure promotes penetration of the lubricant at the point of impact thereof with a part to be lubricated such as the bush at the rear end of an extension housing.

It is accordingly an outstanding object of the present invention to provide an improved method and system for distributing lubricant to parts in an automotive vehicle transmission.

Another object is the provision of a method and system of a foregoing character which is more economical and efficient in connection with lubricating selected parts in a vehicle transmission then heretofore possible.

A further object is the provision of a method and system of the foregoing character by which lubricant can be distributed from a point of source to a selected part in the vehicle transmission which is remote from or at a location relative to the point of source which precludes a direct distribution of lubricant from the point of source to the part without the use of special, structurally complex and expensive arrangements within the transmission housing.

Yet another object is the provision of a method and system of the foregoing character which provides for lubricant to be propelled under pressure along sequential unconfined flow paths which are angularly related to one another to enable distribution of the lubricant to a part or area in a transmission which is not in the path of lubricant flowing in the direction of the initial one of the sequential paths.

Still a further object is the provision of a method and system of the foregoing character which provides for a stream of lubricant to be propelled from a source along an unconfined linear flow path with a velocity sufficient for the stream to be deflected from the linear path and to flow unconfined along at least one additional path and to impact with force against a part in the transmission which is remote with respect to the source.

BRIEF DESCRIPTION OF THE DRAWING

The foregoing objects, and others, will in part be obvious and in part pointed out more fully hereinafter in conjunction with the written description of preferred embodiments of the invention illustrated in the accompanying drawing in which:

FIG. 1 is a sectional elevation view of a transmission extension housing illustrating a lubricant distributing arrangement according to the present invention;

FIG. 2 is a perspective detailed view showing the lubricant deflecting surface on the transmission housing in FIG. 1;

DESCRIPTION OF PREFERRED EMBODIMENTS

Figure 3:
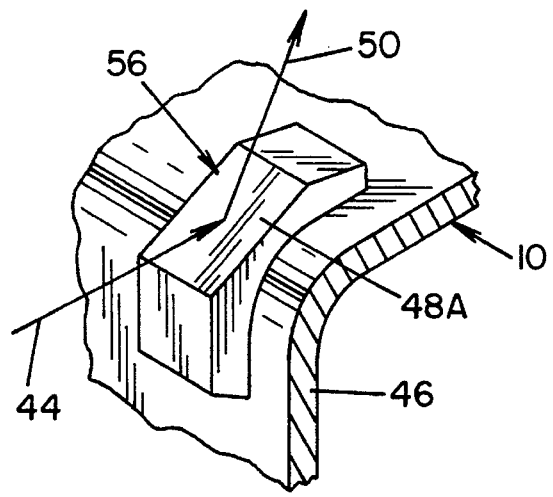
FIG. 3 is a perspective view illustrating a lubricant deflecting member mounted on a transmission housing.

Referring now in greater detail to the drawings wherein the showings are for the purpose of illustrating preferred embodiments of the present invention and not for limiting the invention, FIG. 1 illustrates a transmission extension housing 10 for an automatic transmission which includes a main transmission case or housing 12 which, as is well known, includes a hydraulic control system including an oil pan 14 and an oil pump 16 for generating oil pressure in the hydraulic system. Extension housing 10 is fastened to the rear end of main housing 12 by bolts 18 and encloses an output shaft 20 having an axis A and connected at its inner end to an intermediate shaft in the main housing, not shown. Shaft 20 is rotatably supported at rear wall 13 of main housing 12 by a bush 21, and the outer end of the shaft is splined to a sleeve yoke 22. Output shaft 20 and yoke sleeve 22 are rotatable supported at the rear end of extension housing 10 by a bush 24 interposed between sleeve yoke 22 and rear portion 26 of extension housing 10. A dust cover or seal 28 is interposed between housing portion 26 and sleeve yoke 22 together with an oil seal 30. Seal 30 prevents the ingress of foreign matter along sleeve yoke 22 and the leakage of lubricant oil outwardly of the latter, and dust cover 28 protects the oil seal from the ingress of foreign matter along the sleeve yoke. In the embodiment illustrated, output shaft 20 carries a parking gear 32 adjacent end wall 13 of main housing 12 and a speed sensor component 34 rearwardly of the parking gear. As will become apparent hereinafter, the position and size of speed sensor 34 creates an obstruction to supplying a linear stream of oil under pressure directly to the area of bush 24 which, as is well known, must be constantly lubricated to preclude seizure thereof.

In accordance with one aspect of the present invention, as shown in FIGS. 1 and 2 of the drawing, a wall portion 36 below rear wall 13 of main transmission housing 12 is provided with a lubricant passageway 38 having an inlet end 38a in communication with oil under pressure supplied by pump P. Passageway 38 has an axis 39 and an outlet end which, preferably, is provided by a nozzle 40 mounted on wall portion 36 and having an orifice 42 therethrough coaxial with axis 39. During operation of the vehicle, passageway 38 and orifice 42 provide for a stream or jet of lubricating oil under pressure to be directed along a first unconfined path 44 in the transmission housing. As will be appreciated from FIG. 1, path 44 is laterally offset from bush 24 and is directed toward the inner surface of a wall portion 46 of extension housing 10. The inner surface of wall portion 46 in this embodiment is provided with a deflecting recess including a planar bottom surface 48 which intersects path 44 at an angle thereto and provides for the jet or stream of oil under pressure moving along path 44 to be deflected to flow along a second unconfined path 50 toward bush 24. Paths 44 and 50 have an included angle X therebetween which in this embodiment is an obtuse angle. Lubricant under pressure flows along path 50 directly to the area of bush 24 and, as will be appreciated from FIG. 1, the location and angle of deflecting surface 48 relative to flow path 44 provides for the lubricant to be deflected so as to flow about speed sensor 34. While axis 39 of passageway 38 and orifice 42 and thus flow path 44 is shown as being slightly inclined relative to axis A of output shaft 20, it will be appreciated that the orientation of the orifice axis is dependent on the location of the deflecting surface and the angular relationship required between lubricant flow path 44 and the deflecting surface for the lubricant flowing along path 50 to be directed past speed sensor 34 toward the area to be lubricated. Therefore, these angular relationships will vary and will be designed dependent on the location of the part to be lubricated.

In the embodiment illustrated in FIGS. 1 and 2, deflecting surface 48 is provided by machining the inner surface of wall portion 46 of extension housing 10 which, as will be appreciated from FIG. 2, provides a deflecting recess having side walls 52 and 54 laterally spaced apart with respect to the directions of flow paths 44 and 50, and having a bottom wall defined by planar deflecting surface 48. Side walls 52 and 54 advantageously laterally confine the lubricant so as to control lateral scattering thereof relative to path 50. As an alternative to machining wall portion 46, the deflecting surface can be provided on a deflecting member 56 as shown in FIG. 3 wherein the surface is designated 48A. Member 56 extends inwardly from wall portion 46 of the extension housing and can be cast integral therewith or formed separately and suitably secured to wall portion 46 such as by welding, brazing or through the use of suitable fasteners such as bolts. In any event, member 56 is machined to provide deflecting surface 48A and while the latter is shown in FIG. 3 as a planar surface, it will be understood that the machining operation with respect to deflecting member 56 can provide the latter with a deflecting channel as described hereandabove with regard to FIGS. 1 and 2.

It is to be understood with respect to the present invention that the term "unconfined" in connection with the lubricant flow paths means that the latter are not defined by tubing or other guideways or surfaces along which the lubricant flows in reaching its point of application. Rather, the present invention provides for lubricant to be propelled through the air at a velocity sufficient for the lubricant to directly reach and impact with force against the part to be lubricated. Thus, it will be appreciated that planar deflecting surfaces 48 and 48A are disposed at an angle to first linear flow path 44 which will provide for the deflected lubricant flowing along path 50 to be directed to the desired area in the transmission housing.

Figure 4:
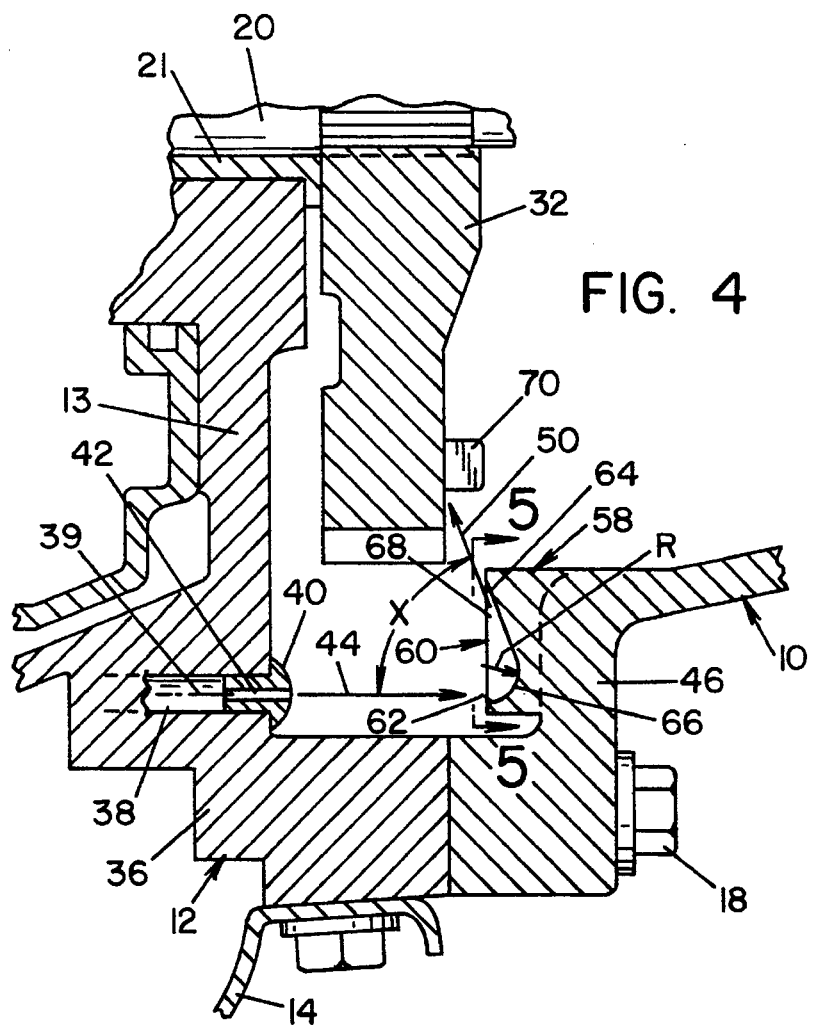
FIG. 4 is a sectional elevation view of a portion of the transmission housing shown in FIG. 1 and illustrating another embodiment of a lubricant distributing arrangement according to the present invention.
Figure 5:
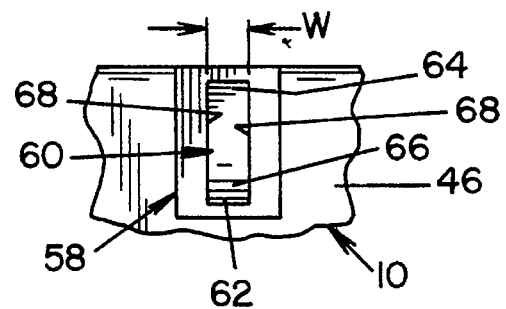
FIG. 5 is an elevation view of the lubricant deflector shown in FIG. 4 looking in the direction of line 5—5.

FIGS. 4 and 5 of the drawing illustrate another embodiment of a lubricant distributing arrangement according to the present invention. In this embodiment, a deflecting member 58 is shown as being cast integral with wall portion 46 of the extension housing and machined to provide a deflecting recess 60 facing the outlet end of nozzle 40. Deflecting recess 60 includes a deflecting surface having an entrance end 62 extending in the direction of flow path 44 and an exit end 64 providing for flow path 50 to extend rearwardly with respect to the direction of flow path 44, whereby the included angle X between the flow paths is an acute angle. The deflecting surface further includes a curved or arcuate transition portion 66 between the entrance and exit ends which facilitates transitional flow from path 44 to path 50 with minimal turbulence. In this embodiment, transition portion 66 has a radius of curvature R of about 0.75 inch, and deflecting slot 60 has laterally spaced apart side walls 68 providing the recess with a width W of about 0.20 inch. The contour of the deflecting surface together with the width of the recess and the diameter of the stream of lubricant flowing through nozzle orifice 42 are co-operable to optimize the flow of lubricant between the entrance and exit ends of the deflecting surface with minimal turbulence while controlling lateral scattering of the lubricant flowing along path 50. Deflecting recess 60 advantageously provides for distributing lubricant along an unconfined path rearwardly with respect to the direction of flow of lubricant along path 44 and, as will be appreciated from FIG. 4, such flow enables distributing lubricant to the parking brake gear 32 in the transmission assembly illustrated in FIG. 1. In conjunction therewith, the parking brake gear can be provided with a plurality of blades 70 circumferentially spaced apart about the periphery thereof for slinging oil flowing to the gear along flow path 50.

Figure 6:
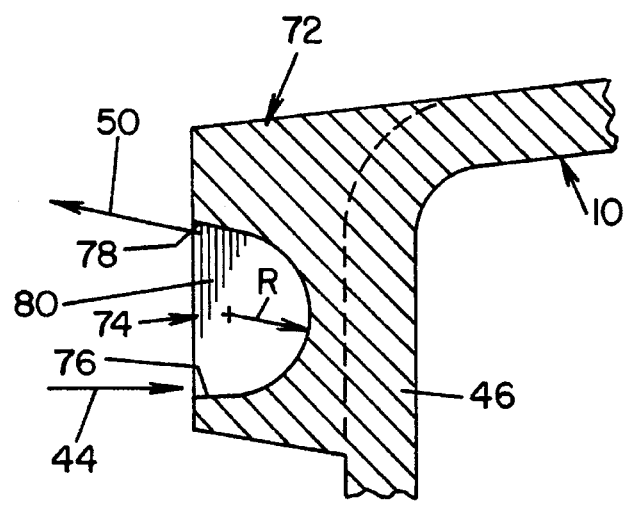
FIG. 6 is a sectional elevation view illustrating another lubricant deflector in accordance with the invention.

With regard to obtaining a reversal of the direction of flow of lubricant relative to the direction of flow path 44 from nozzle orifice 42, it will be appreciated from FIG. 4 that the angular disposition of flow path 50 relative to flow path 44 can be varied from that shown in FIG. 4 and, in this respect, to a direction providing an included angle approaching 90° and an included angle approaching 0° as shown in FIG. 6 of the drawing. More particularly in this respect, the latter figure illustrates a deflecting member 72 integral with housing portion 46 and provided with a lubricant deflecting recess 74. Recess 74 includes a deflecting surface having an entrance end 76 and an exit end 78 and which deflecting surface has a substantially uniform radius of curvature R between the entrance and the exit ends. As with the embodiment of FIGS. 4 and 5, radius R can be about 0.750 inch and the recess can have a width of about 0.20 inch between the side walls thereof, one side wall 80 of which is visible in FIG. 6.

Figure 7:
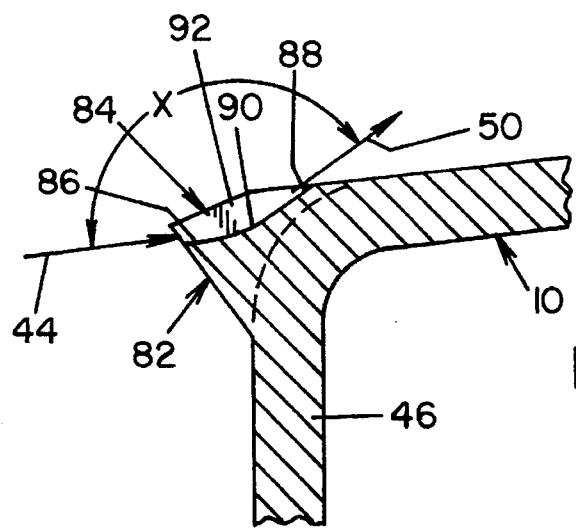
FIG. 7 is a sectional elevation view illustration yet a further lubricant deflector in accordance with the invention.

FIG. 7 illustrates yet another deflecting surface configuration for use with a lubricant distributing arrangement according to the present invention. In this embodiment, a deflector member 82 which is shown as integral with wall portion 46 of the transmission extension housing is provided with a deflecting recess 84 in which the deflecting surface is defined by a linear entrance end 86, a linear exit end 88 and an arcuate transition portion 90 therebetween. Entrance end 86 receives lubricant flowing along path 44 from nozzle 40, linear exit end 88 directs the lubricant along flow path 50 toward the area in the transmission to be lubricated, and arcuate portion 90 enhances the transition of lubricant flow from entrance end 86 to exit end 88 with minimal turbulence. This deflector surface configuration provides for the included angle X between flow paths 44 and 50 to be an obtuse angle as is provided by the planar deflecting surface 48 in the embodiments of FIGS. 1–3. As in the embodiments of FIGS. 4–6, deflecting recess 84 has laterally spaced apart side walls, one of which is visible in FIG. 7 and designated by the numeral 92, and the deflecting recess together with the configuration of the deflecting surface minimizes lateral scattering of the lubricant flowing along path 50 relative to that resulting from the impingement of lubricant against planar deflecting surfaces 48 and 48A in the embodiments of FIGS. 1–3. While the deflecting surface in the embodiment illustrated in FIG. 7 as described above has linear entrance and exit portions with an arcuate transition portion therebetween, it will be appreciated that the deflecting surface could be of uniform radius between the entrance and exit ends thereof with the length of the deflecting surface providing for the desired direction of flow of lubricant from the exit end along path 50.

In connection with delivering lubricant in accordance with the present invention, the primary factor with respect to achieving the desired flow to a selected location in the transmission housing is the distance the oil has to travel from the source such as nozzle 40 to the area where lubrication is desired. Variables in connection with achieving the desired oil flow thus include the outlet orifice size, oil pressure, the angle between the flow paths and/or the number and configuration of deflecting surfaces between the outlet orifice and the area to be lubricated. In conjunction with the embodiments disclosed herein, satisfactory delivery of lubricating oil can be achieved with an orifice diameter of from about 0.030 to 0.040 inch and delivery through the orifice at a pressure of from 2 to 50 psi. It will be appreciated, of course, that the pressure varies with engine speed and that the operation with respect to delivering oil a considerable distance such as to the rear bush improves as the pressure of delivery increases.

While considerable emphasis has been placed herein on the embodiments illustrated, it will be appreciated that many embodiments of the invention can be made and that many changes can be made in the embodiments illustrated without departing from the principals of the invention. In this respect, for example, while the distribution of lubricant is illustrated in conjunction with a single deflecting surface, it will be appreciated that a second deflecting surface could be provided to intersect lubricant flowing along path 50 thus to deflect the lubricant in a direction at an angle to path 50 toward the area to be lubricated. It is only important in this respect that the lubricant be propelled with sufficient velocity to flow unconfined from the outlet orifice to the area or part in the transmission housing to be lubricated. Further, while the preferred embodiments are illustrated in conjunction with an automatic transmission in which the hydraulic system includes a pump for pressurizing lubricant, it will be appreciated that the invention is applicable to a manual transmission by providing the latter with a pump capable of propelling the lubricant in the manner and for the purpose described herein. Still further, while a nozzle is disclosed having an orifice to provide flow along path 44, it will be understood that such flow can be achieved otherwise and, for example, by an orifice plate at the outlet end of passageway 38 or by a restriction in the passageway itself. These and other modifications as well as other embodiments of the invention will be suggested or obvious to those skilled in the art, whereby it is to be distinctly understood that the foregoing descriptive matter is to be interpreted merely as illustrative of the present invention and not as a limitation.

Having thus described the invention, it is claimed:

1. In a motor vehicle transmission comprising housing means including an element to be lubricated and a lubricating system including a source of lubricant under pressure and means for delivering lubricant from said source to said element, the improvement comprising: said means for delivering lubricant including passageway means having an inlet end for receiving said lubricant under pressure from said source and fixed outlet end means for directing a stream of said lubricant under pressure along a first unconfined linear path in said housing means laterally offset from said element, and deflector means in said housing means for deflecting said stream of lubricant to flow unconfined from said first path linearly toward said element.

2. The improvement according to claim 1, wherein said deflector means includes deflector surface means intersecting said first linear path for deflecting said stream of lubricant to flow along a second unconfined path at an angle to said first path.

3. The improvement according to claim 2, wherein said angle is an obtuse angle.

4. The improvement according to claim 2, wherein said angle is an acute angle.

5. The improvement according to claim 2, wherein said deflector means is a deflector member mounted in said housing means.

6. In a motor vehicle transmission comprising housing means including an element to be lubricated and a lubricating system including a source of lubricant under pressure and means for delivering lubricant from said source to said element, the improvement comprising: said means for delivering lubricant including passageway means having an inlet end for receiving said lubricant under pressure from said source and outlet end means for directing a stream of said lubricant under pressure along a first unconfined path in said housing means laterally offset from said element, deflector means in said housing means for deflecting said stream of lubricant to flow unconfined from said first path toward said element, said deflector means including deflector surface means intersecting said first path for deflecting said stream of lubricant to flow along a second unconfined path at an angle to said first path, said housing means including inner surface means, and said deflector surface means being formed in said inner surface means.

7. In a motor vehicle transmission comprising housing means including an element to be lubricated and a lubricating system including a source of lubricant under pressure and means for delivering lubricant form said source to said element, the improvement comprising: said means for delivering lubricant including passageway means having an inlet end for receiving said lubricant under pressure from said source and outlet end means for directing a stream of said lubricant under pressure along a first unconfined path in said housing means laterally offset from said element, deflector means in said housing means for deflecting said stream of lubricant to flow unconfined from said first path toward said element, said deflector means including deflector surface means intersecting said first path for deflecting said stream of lubricant to flow along a second unconfined path at an angle to said first path, said deflector surface means having entrance and exit ends and an arcuate portion therebetween, said entrance end receiving lubricant moving along said first path, and said exit end directing said lubricant to move along said second path.

8. The improvement according to claim 7, wherein said arcuate portion has an angular extent greater than 90°.

9. The improvement according to claim 7, wherein said deflector surface means includes bottom and side wall means between said inlet and exit means.

10. The improvement according to claim 1, wherein said outlet end means of said passageway means included nozzle means having an outlet aparature of from about 0.030 to 0.040 inch diameter.

11. In a motor vehicle transmission comprising housing means including an element to be lubricated and a lubricating system including a source of lubricant under pressure and means for delivering lubricant from said source to said element, the improvement comprising: said means for delivering lubricant including passageway means having an inlet end for receiving said lubricant under pressure from said source and outlet end means for directing a stream of said lubricant under pressure along a first unconfined path in said housing means laterally offset from said element, deflector means in said housing means for deflecting said stream of lubricant to flow unconfined from said first path toward said element, said deflector means including a deflector slot, said slot having entrance and exit ends, said entrance end receiving said lubricant moving along said first path, and said exit end directing said lubricant along a second path at an angle to said first path.

12. The improvement according to claim 11, wherein said deflector slot is integral with said housing means.

13. The improvement according to claim 11, wherein said deflector means includes deflector member means having said slot therein, said deflector member means being mounted in said housing means.

14. The improvement according to claim 11, wherein said slot has a width of about 0.20 inch between said entrance and exit ends.

15. The improvement according to claim 11, wherein said slot has an arcuate bottom wall portion between said entrance and exit ends, said arcuate portion having an angular extent greater than 90°.

16. The improvement according to claim 15, wherein said outlet end means of said passageway means includes an outlet aperture of from about 0.030 to 0.040 inch diameter.

17. The improvement according to claim 16, wherein said slot has a width of about 0.20 inch between said entrance and exit ends.

18. The improvement according to claim 17, wherein said deflector slot is integral with said housing means.

19. The improvement according to claim 17, wherein said deflector means includes deflector member means having said slot therein, said deflector member means being mounted in said housing means.

20. A method of distributing lubricant to an element in extension housing means of a motor vehicle automatic transmission including a source of lubricant under pressure, comprising continuously propelling an uninterrupted stream of lubricant under pressure form said source along a first unconfined linear path in said housing means laterally offset from said element, and deflecting said uninterrupted stream of lubricant to flow unconfined from said first path to impact directly against said element.

21. The method according to claim 20, wherein said deflecting includes deflecting said lubricant to flow from said first path along a second unconfined path at an angle to said first path.

22. The method according to claim 21, wherein said second path is at an acute angle to said first path.

23. The method according to claim 21, wherein said second path is at an obtuse angle to said first path.

24. The method according to claim 21, and deflecting said lubricant along an arcuate transition path between said first and second paths.

25. The method according to claim 24, wherein said transition path has an arcuate extent greater than 90°.

* * * * *